(12) United States Patent
Basturk

(10) Patent No.: US 6,587,083 B1  
(45) Date of Patent: Jul. 1, 2003

(54) DISPLAY ASSEMBLY INCLUDING TWO SUPERPOSED DISPLAY DEVICES

(75) Inventor: Naci Basturk, Enges (CH)

(73) Assignee: Asulab S.A., Bienne (CH)

(*) Notice: Subject to any disclaimer, the term of this patent is extended or adjusted under 35 U.S.C. 154(b) by 340 days.

(21) Appl. No.: 09/660,488

(22) Filed: Sep. 12, 2000

(30) Foreign Application Priority Data

Sep. 13, 1999 (CH) .............................................. 1672/99

(51) Int. Cl.[7] ................................................. G09G 5/00
(52) U.S. Cl. ........................................... 345/4; 368/84
(58) Field of Search ....................... 368/82, 84; 345/4, 345/5

(56) References Cited

U.S. PATENT DOCUMENTS

| | | | | |
|---|---|---|---|---|
| 4,488,818 A | * | 12/1984 | Saurer et al. | 368/71 |
| 4,521,775 A | * | 6/1985 | Noble | 345/4 |
| 4,562,433 A | * | 12/1985 | Biferno | 345/4 |
| 4,568,928 A | * | 2/1986 | Biferno | 345/5 |
| 4,583,824 A | * | 4/1986 | Lea | 359/223 |
| 4,849,130 A | * | 7/1989 | Dabrowski et al. | 252/299.61 |
| 5,113,272 A | * | 5/1992 | Reamey | 349/78 |
| 5,740,130 A | * | 4/1998 | Grupp et al. | 368/82 |
| 5,813,742 A | * | 9/1998 | Gold et al. | 358/88 |
| 5,821,867 A | * | 10/1998 | Angell et al. | 340/815.45 |
| 5,822,021 A | * | 10/1998 | Johnson et al. | 348/742 |
| 5,892,455 A | * | 4/1999 | Matsumoto | 340/7.55 |
| 5,989,461 A | * | 11/1999 | Coates et al. | 252/585 |
| 6,160,655 A | * | 12/2000 | Fix et al. | 359/265 |
| 6,181,301 B1 | * | 1/2001 | Inoguchi et al. | 345/5 |
| 6,185,161 B1 | * | 2/2001 | Arikawa et al. | 368/84 |
| 6,292,439 B1 | * | 9/2001 | Akiba et al. | 368/84 |
| 6,330,208 B1 | * | 12/2001 | Chen et al. | 368/84 |

FOREIGN PATENT DOCUMENTS

| | | |
|---|---|---|
| EP | 926 574 | 6/1999 |
| EP | 933 663 | 8/1999 |
| EP | 935 155 | 8/1999 |

* cited by examiner

*Primary Examiner*—Steven Saras  
*Assistant Examiner*—Leland R. Jorgensen  
(74) *Attorney, Agent, or Firm*—Sughrue Mion, PLLC

(57) ABSTRACT

The present invention concerns a display assembly including two superposed, respectively top (52) and bottom (54), display devices, the top display device (52) including a double structure formed of a display cell (56) arranged above an optical valve (58), said double structure being arranged so that said cell (56) and said valve (58) are transparent in a first state to make the bottom display device (54) visible, and so that the cell (56) displays an item of data and so that the valve (58) is opaque and at least partially masks the bottom display device (54) in a second state, control means supplying a control voltage to cause the display cell (56) and the optical valve (58) to pass from the first state to the second state and vice versa, characterised in that the display cell (56) is of the reflective type in the switched state, and in that the optical valve (58) is formed of a cell having an absorbent state in the switched state.

14 Claims, 3 Drawing Sheets

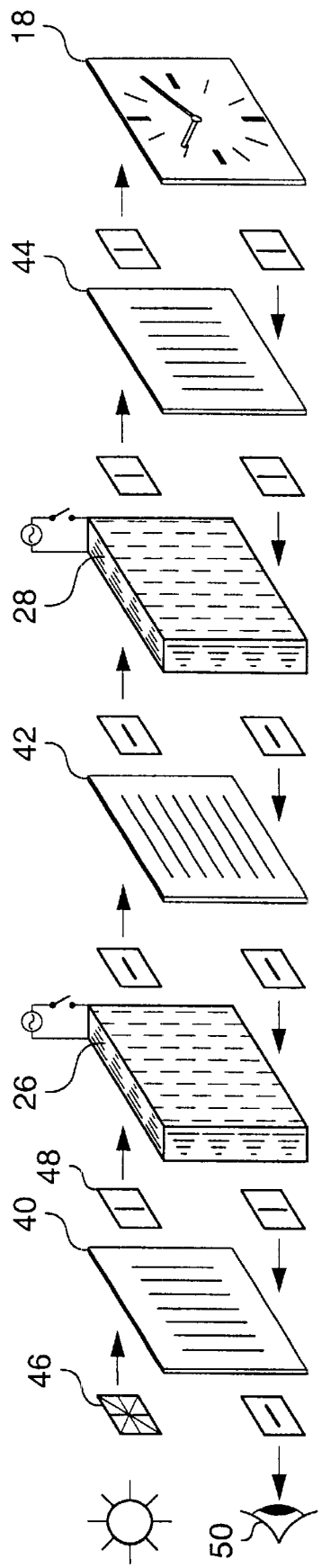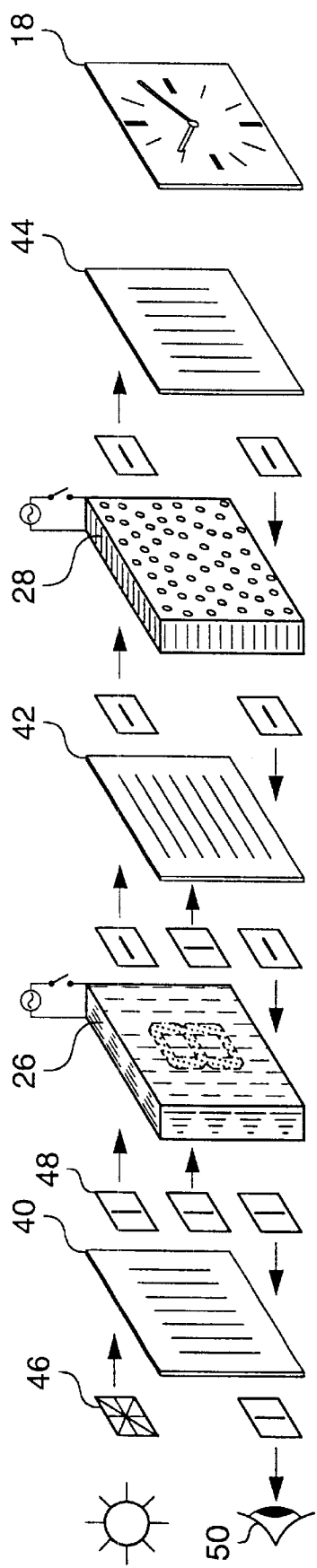
Fig. 2A (PRIOR ART)
Fig. 2B (PRIOR ART)

DISPLAY ASSEMBLY INCLUDING TWO SUPERPOSED DISPLAY DEVICES

BACKGROUND OF THE INVENTION

The present invention concerns a display assembly including two superposed display devices and, more particularly, an assembly of this type including means allowing one of the display devices to appear to an observer selectively, to the exclusion of the other.

The present invention also concerns a timepiece including a display assembly of the aforementioned type and, more particularly, such a display assembly wherein an analogue display device is combined with a digital display device.

A display assembly including two superposed display devices is already known from European Patent No. EP 0 926 574 in the name of the Applicant. This display assembly is shown in FIG. 1 annexed to the present Patent Application.

FIG. 1 shows a timepiece of the wristwatch type designated as a whole by the general numerical reference 1. This watch 1 includes, in a conventional manner, a case 2 in the back cover 4 of which are arranged an electronic clockwork movement 6 and a battery 8 which rest on back cover 4 via a contact spring 10. Movement 6 includes electronic timekeeping circuits associated, via a control circuit, to a drive device (not shown) for a second hand 12, a minute hand 14 and an hour hand 16 which move above a dial 18 which bears hour symbols (not shown). Case 2 is also closed in a conventional manner by a crystal 20 covering all of dial 18.

Watch 1 further includes a display assembly including two superposed display devices respectively top device 22 and bottom device 24.

In the example shown in FIG. 1, bottom display device 24 includes analogue time display means formed by hands 12, 14 and 16 and dial 18.

According to the invention disclosed in European Patent No. EP 0 926 574, top display device 22 includes a double structure formed of a display cell 26 arranged above an optical valve 28, this display device 22 extending between bottom display device 24 and crystal 20.

Top display device 22 is arranged, on the one hand, so that display cell 26, arranged between crystal 20 and optical valve 28, like the latter, is transparent in a first switching state of cell 26 and valve 28, so as to make the data displayed by bottom display device 24, i.e. hands 12, 14 and 16 and dial 18, visible.

On the other hand, top display device 22 is arranged so that display cell 22 displays an item of data, for example of the alphanumerical type, and so that valve 28 masks bottom display device 24 in a second switching state.

As a result of these features, it is possible to use selectively either bottom display device 24, or top display device 22. If one chooses to use bottom display device 24, top display device 22 can be switched into its first state in which it is transparent, so that the data displayed by bottom display device 24 is visible. If, conversely, one chooses to use top display device 22, optical valve 28 is then switched into the second state in which it is opaque and reflective to completely mask bottom display device 24, while cell 26 of top display device 22 can display the desired data.

According to the particular embodiment shown in FIG. 1, cell 26 is a liquid crystal type display cell. Cell 26 includes a transparent front substrate 30, a back substrate 32 which is also transparent and a sealing frame 34 forming spacing and closing means which, with substrates 30 and 32, delimit a closed cavity in which is located a layer of liquid crystals. The opposite faces of substrates 30 and 32 include transparent electrodes respectively 36 and 38, made, for example, of indium/tin oxide. In the example illustrated, front substrate 30 carries electrodes configured in digits each formed of segments allowing alphanumerical characters to be displayed, while back substrate 32 carries an electrode extending over its entire surface.

When a voltage is applied or removed across electrode 38 and certain of electrodes 36, the liquid crystals located between these electrodes 36 and 38 are switched alternately from an absorbent state to a transparent state or vice versa, according to the type of liquid crystals in question and/or the presence and arrangement of polarisers associated with the cell. It is thus possible to display data in a light colour on a dark background or in a dark colour on a light background.

In the following description, elements which are identical to those previously described will be designated by the same numerical references.

In the example shown in FIGS. 2A and 2B annexed to the present patent Application, display cell 26 is a liquid crystal cell of the twisted nematic type of which the respective outer surfaces of substrates 30 and 32 are provided with absorbent polarisers 40 and 42 of crossed orientation. Thus, cell 26 is completely transparent in the first switching state (FIG. 2A), when no voltage is applied across the terminals of its electrodes 36, 38 (non-switched state), and is absorbent or diffusing in the second switching state (FIG. 2B), when a voltage is applied across the terminals of its electrodes 36, 38 (switched state). In the example shown, the optical valve includes, starting from the side of dial 18, a reflective polariser 44 and a liquid crystal cell of the twisted nematic type. Valve 28 is thus transparent in the non-switched state (FIG. 2A) and opaque and reflective in the switched state (FIG. 2B).

In the first switching state shown in FIG. 2A the natural non-polarised light, designated by the numerical reference 46, is vertically polarised by first absorbent polariser 40. The direction of polarisation of the light, designated by the reference 48, is then rotated by 90° during its passage through display cell 26, then it is transmitted unmodified by second absorbent polariser 42. Polarised light 48 is then again rotated through 90° during its passage through optical valve 28, then it is transmitted unmodified by reflective polariser 44 to dial 18. The light follows the same path during its return travel, so that the dial is visible to an observer 50.

Conversely, when cell 26 and valve 28 are in the switched state, the dial is totally masked. Indeed, as is seen in FIG. 2B, the vertically polarised light which passes through cell 26 in the switched zones of the latter is not modified, so that it is absorbed by absorbent polariser 40. In the same time, the light which passes through cell 26 outside the switched zones of the cell is rotated through 90° as already explained above, then transmitted without being modified by absorbent polariser 42 up to valve 28. Valve 28 being in the switched state, the polariser light passes through it without being modified is totally reflected by reflective polariser 44. Dial 18 is thus masked, and the data is displayed in a dark colour on a light background with a mirror-like appearance.

The embodiment described above has several drawbacks.

The mirror-like appearance of the background on which the data displayed by display cell 26 appears is dazzling and thus makes it difficult to read this data, and this is all the more so when the ambient lighting is strong.

Moreover, since the light is reflected on reflective polariser 44, and thus at a certain distance from display cell 26, typically of the order of two to three millimetres, the images of the switched segments of cell 26 appear in projection on said reflective polariser 44, which leads to double vision of the displayed data. This is detrimental not only to the aesthetic appearance of the watch, but also, of course, to the legibility of the displayed data.

Finally, when one looks at the watch from certain angles, bottom display device 24 remains visible although top display device 22 is in the switched state in which it should normally completely mask said bottom device 24.

SUMMARY OF THE INVENTION

The object of the present invention is to overcome the aforementioned drawbacks of the prior art by providing a display assembly including two superposed, respectively top and bottom, display devices, wherein it is possible to make data displayed by one of the display devices visible to an observer selectively, to the exclusion of the data displayed by the other display device, and with improved legibility of the data displayed by the display device in question.

Another object of the present invention is to provide a display assembly wherein the top display device is a liquid crystal device with excellent display contrast.

Another object of the present invention is to provide a timepiece fitted with such a display assembly having an improved aesthetic appearance.

The present invention therefore concerns a display assembly including two superposed, respectively top and bottom, display devices, the top display device including a double structure formed of a display cell arranged above an optical valve, said double structure being arranged so that said cell and said valve are transparent in a first state to make the bottom display device visible, and so that the cell displays an item of data and so that the valve is opaque and at least partially masks the bottom display device in a second state, control means supplying a control voltage to cause the display cell and the optical valve to switch from the first state to the second state and vice versa, characterised in that the display cell is of the reflective type in the switched state, and in that the optical valve is formed of a cell having an absorbent state in the switched state.

As a result of these features, the reflection of the incident light penetrating the display assembly according to the invention no longer occurs on a reflective polariser placed behind the optical valve as was the case in the prior art, but directly on the display cell when the latter is switched into the second state in which it displays a data item. This thus allows any parasitic projection of the switched zones onto the reflective polariser to be eliminated, and thus prevents double display of these zones to the observer.

Moreover, unlike the prior art wherein the data was displayed in a dark colour on a totally reflective background, only the switched segments of the display cell are reflective and are displayed in a light colour on a dark background formed by the optical valve which is absorbent in the second switching state. Such a structure is thus less dazzling for the observer. It also allows the luminosity of the displayed data to be increased, and thus its legibility.

Finally, since the optical valve is absorbent in the switched state, it is no longer possible to see the bottom display device through it, from whatever angle one looks at the display assembly.

According to an advantageous embodiment, the display device and optical valve are in a transparent state in the absence of any voltage applied by the control means. Thus, the data displayed by the bottom display device is permanently visible, without the top display device consuming any power. This is particularly advantageous within the scope of an application to a portable object such as a wristwatch.

According to another feature of the invention, the display cell is formed of a twisted nematic type cell, an absorbent polariser placed in front of the cell, and a reflective polariser placed behind the cell.

According to yet another feature of the invention, the optical valve is formed of a liquid crystal cell of the twisted nematic type and an absorbent polariser placed behind the cell.

BRIEF DESCRIPTION OF THE DRAWINGS

Other features and advantages of the present invention will appear more clearly upon reading the following detailed description of an embodiment example of the display assembly according to the invention, this example being given purely by way of illustrative and non-limiting example, with reference to the annexed drawings, in which:

FIGS. 2A and 2B, which have already been cited, are schematic views of the display assembly of FIG. 1 switched respectively into a first state in which it is transparent, so that the data displayed by the bottom display device is visible, and into a second state in which the optical valve is opaque and reflective to totally mask the bottom display device, while the display cell of the top display device can display the desired data.

DETAILED DESCRIPTION OF THE INVENTION

The present invention proceeds from the general inventive idea which consists in superposing two, respectively top and bottom, display devices, one of these display devices being able to appear selectively to an observer to the exclusion of the other. The top display device therefore includes a double structure formed of a display cell arranged above an optical valve. This top display device is arranged so that, in a first state, the display cell and the optical valve are both transparent to allow the data displayed by the bottom display device to appear. Moreover, the top display device is arranged so that, in a second state, the display cell operates in negative contrast, i.e. the switched segments are reflective and stand out on a dark background formed by the optical valve which is reflective and which masks the bottom display device.

The description of the invention is made within the scope of an application to a timepiece such as a wristwatch. It goes without saying however that the invention is not limited to this application and it could advantageously be used within the scope of any other application requiring the display of data such as, for example, measuring instruments.

Figure 1:
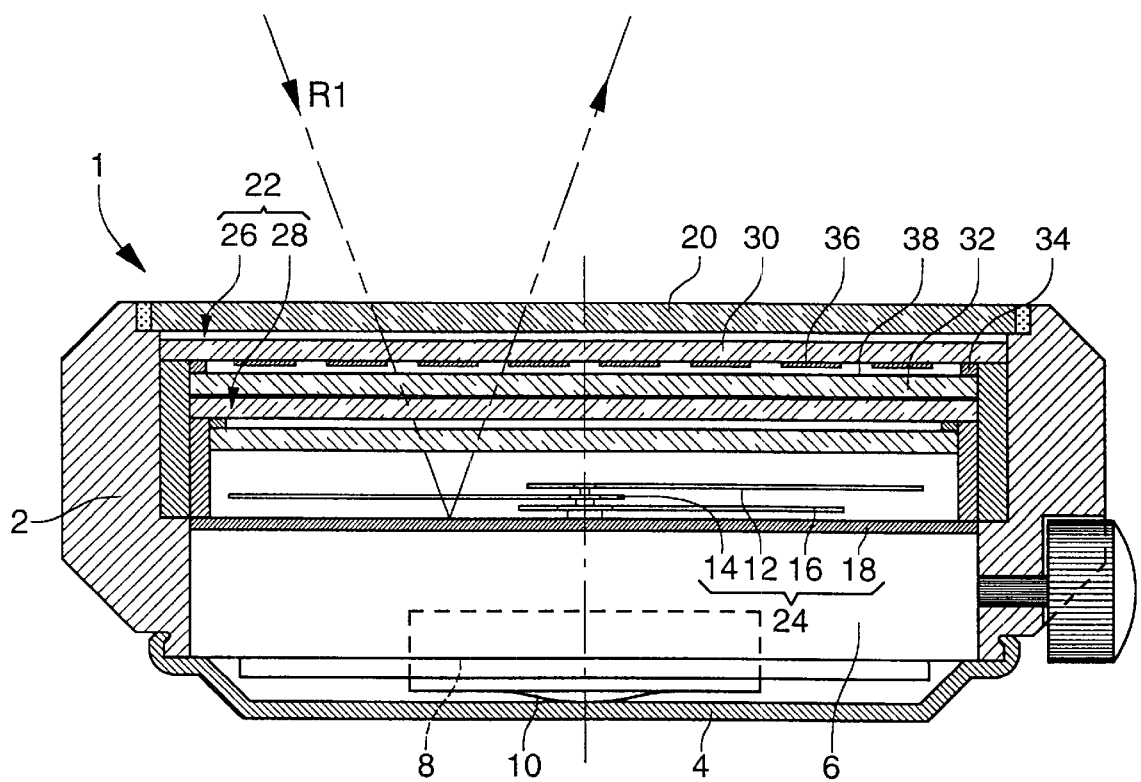
FIG. 1, which has already been cited, is a cross-section of a wristwatch fitted with a display assembly according to the prior art, the assembly being switched into a first state allowing the bottom display device to appear.
Figure 3A:
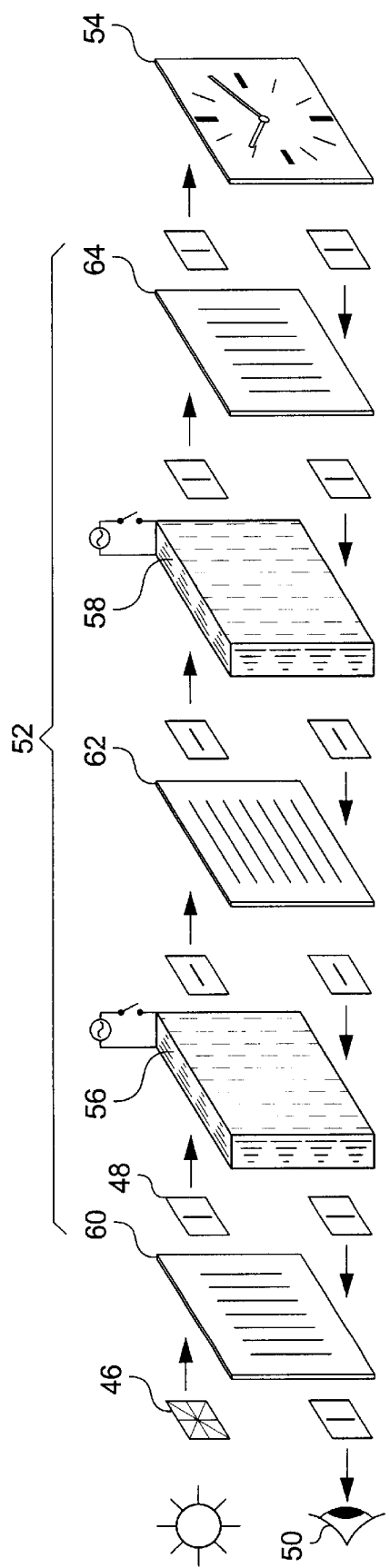
FIGS. 3A and 3B are schematic views of the display assembly according to the invention switched respectively into a first state in which it is transparent, so that the data displayed by the bottom display device is visible, and into a second state in which the optical valve is absorbent to totally mask the bottom display device, while the switched segments of the display cell of the top display device are reflective to display the desired data.
Figure 3B:
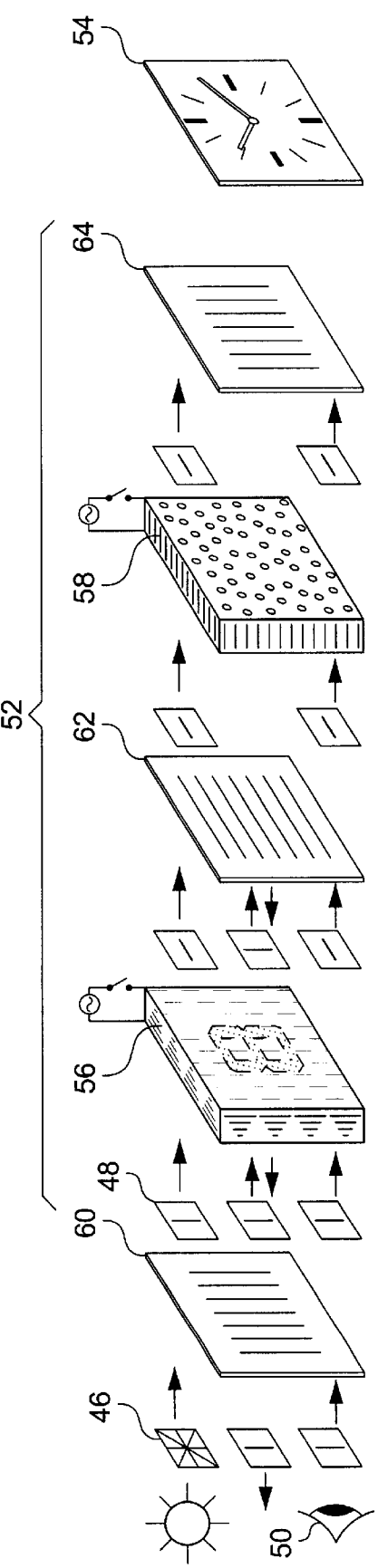

In the example shown in FIGS. 3A and 3B, the display assembly according to the invention includes, in a conventional manner, two superposed display devices, respectively top device 52 and bottom device 54. Bottom display device 54 includes analogue time display means formed by hands moving above a dial which bears hour symbols. It goes without saying however that bottom display device 54 may be formed by any display device, for example a liquid crystal type digital display device. This bottom display device 54 may also include a combination of analogue and digital display means or even a decorative element, for example a picture, a figure or something else. As regards top display device 52, this includes a double structure formed of a display cell 56 arranged above an optical valve 58.

With reference to FIGS. 3A and 3B, display cell 56 is a twisted nematic type liquid crystal cell (TN) of which the outer surfaces of the front and back substrates are provided with an absorbent polariser 60 and a reflective polariser 62 respectively. The optical valve includes, starting from the side of dial 54, an absorbent polariser 64 and a twisted nematic type liquid crystal cell.

In the first switching state shown in FIG. 3A, natural non-polarised light 46 is polarised vertically by absorbent polariser 60. Polarised light 48 is then rotated through 90° during its passage through display cell 56, then it is transmitted without modification by reflective polariser 62. The polarised light it then again rotated through 90° during its passage through optical valve 58, then it is transmitted without modification by absorbent polariser 64 to dial 54. The light follows the same path during its return travel, so that dial 54 is visible to observer 50.

Conversely, when display cell 56 and optical valve 58 are in the switched state, dial 54 is totally masked. Indeed, as is seen in FIG. 3B, the vertically polarised light which passes through cell 56 in the switched zones thereof, is not modified, so that it is reflected by reflective polariser 62. At the same time, the light which passes through cell 56 outside the switched zones thereof is rotated through 90°, then it is transmitted without modification by reflective polariser 62. Since valve 58 is in the switched state, the polarised light passes through it without being modified and is then totally absorbed by absorbent polariser 64. Dial 54 is thus masked, and display cell 56 operates in negative contrast, i.e. the switched segments are reflective and stand out on a dark background formed by optical valve 58 which absorbs the light and which masks dial 54.

Absorbent polarisers 60 and 64 used within the scope of the present invention may be those manufactured by the Japanese companies Nitto Denko, Sanritz or Sumitomo. In an advantageous manner, reflective polariser 62 can be, for example, of the multi-layered type marketed under the name of DBEF (Dual Brightness Enhancement Film) by the 3M company or of the holographic type marketed by the Polaroid company.

It goes without saying that cell 56 and valve 58 may be of another type provided that in a first switching state, cell 56 and valve 58 are transparent, and that in a second switching state, cell 56 is reflective and valve 58 is absorbent.

One could in particular select cells of the Super Twist-Nematic (STN), Guest-Host (GH), electrically controlled birefringence (ECB), cholesteric texture, ferroelectric, electrochromic, electrolytic, electrocapillary type. Optical valve 28 may be of the same type as display cell 56. Two cells of different types selected from the above group of cells may also be combined.

The structure and operation of these types of cells are well known to those skilled in the art and will not be described in detail in this description.

For a complete description of the structure and operation of an STN type cell, reference will be made for example to European Patent No. EP 0 131 216 which is incorporated here by reference.

For a complete description of the structure and operation of a GH type cell, reference will be made for example, for a positive contrast GH cell, i.e. which displays in a dark colour on a light background, to U.S. Pat. No. 4,257,682 which is incorporated by reference here, and, for a negative contrast GH cell, i.e. which displays in a light colour on a dark background, to the publication by G. H. Heilmeier and L. A. Zanomi entitled "Guest-Host Interaction in Nematic Liquid Crystals A New Electro-optical Effect" published in Appl. Phys. Lett. vol. 13, No 3, pages 91–92, year 1968.

For a complete description of the structure and operation of a ECB type cell, reference will be made for example to volume 3 of the work entitled "Liquid Crystals Applications and Uses" edited by B. Bahadur at pages 254–300, which is incorporated here by reference.

For a complete description of the structure and operation of a cholesteric texture type cell, reference will be made for example to U.S. Pat. No. 5,188,760 and European Patent No. EP 0 451 905 which are incorporated here by reference.

For a complete description of the structure and operation of a ferroelectric type cell, reference will be made for example to volume 1 of the work entitled "Liquid Crystals Applications and Uses" edited by B. Bahadur at pages 307–356, which is incorporated here by reference.

All the types of cells described above may of course be addressed passively by a matrix electrode network or actively addressed by non linear elements such as thin film transistors (TFT, MIM) or diodes.

Optical valve 58 may, for example, be formed of an electrolytic cell which is transparent in the non switched state, and which is absorbent in the switched state. Such a valve 58 includes an electrolytic solution of a metal salt dissolved in a solvent placed between two electrodes. When valve 58 is in a non switched state, the metal in the solution is deposited over the entire surface of one of the electrodes, and thus makes valve 58 absorbent. When valve 58 is in the non switched state, the metal dissolves again in the solution, and the cell becomes transparent again. Such a valve 58 is for example described in the publication by J. Duchêne et al. entitled "Electrolytic Display" published in SID 1978 at pages 34 to 37 which is incorporated here by reference.

Of course, according to an alternative embodiment, optical valve 58 may be formed of a mercury electrocapillary cell including a capillary film arranged between two substrates bearing electrodes which, in the cell's switched state, do not wet the surface of the substrates, so that the cell is transparent and which, in the cell's non switched state, wets the entire surface of the substrates to make it absorbent. Such a cell is for example described in U.S. Pat. No. 4,583,824 which is incorporated here by reference.

According to another alternative embodiment, the optical valve may, for example, be formed of an electrochromic cell known to those skilled in the art and described in the publication by C. M. Lampert and C G Granquist entitled "Large-area Chromogenics: Materials and Devices for Transmittance Control" published in SPIE press, volume 15. 4. 1988 which is incorporated here by reference.

According to another alternative embodiment, optical valve 58 may be formed of a switchable reflector including a stack formed of a polariser, a twisted nematic (TN) type liquid crystal cell, a quarterwave plate, and a cholesteric film such as the reflector described in the publication by T. J.

Scheffer entitled "Twisted Nematic Display with Cholesteric Reflector" published in J. Phs. Appl. Phy., vol. 8, 1975 which is incorporated here by reference. Preferably, the polariser is of the high polarisation and transmission efficiency type, for example such as the polariser marketed by the Sanritsu company, Japan, under the reference $LLC_2 5618SF$. Advantageously, the quarterwave plate and the cholesteric film can be integrated in a single element, for example, such as the TRANSMAX® marketed by Merck.

It will also be noted in this regard that, according to another variant, the twisted nematic (TN) liquid crystal cell described in the publication by Scheffer may be replaced by a colour display device such as those described in European Patent No. EP 0 600 349 which is also incorporated here by reference.

Within the scope of the invention, the switchable reflector is advantageously transparent in the non switched state, and absorbent in the switched state.

Optical valves 58 which have just been described are all transparent in the non switched state, and may advantageously be combined with cells 56 which are also transparent in a non switched state. Thus, within the scope of the application to a timepiece, bottom display device 54 may be permanently visible with minimum power consumption, insofar as said bottom display device 54 needs to be powered, top display device 52 only being powered when the user wishes to read data supplied by display device 52.

According to another variant, optical valve 58 may be made by means of a switchable cholesteric film which is transparent in a switched state, and absorbent in a non switched state. Such a cholesteric film is for example described in European Patent No. EP 0 643 121 which is incorporated here by reference.

The present invention also concerns a timepiece including a case closed by a crystal and a back cover in which is housed a clockwork movement associated with a display device of time related information, this timepiece including a display assembly as described above, bottom display device 54 being formed by said display device of time related information, and top display device 52 extending between the crystal and said display device of time related information. This display device of time related information may include a dial as well as an hour hand and a minute hand which move above the dial.

Finally, according to a particularly advantageous embodiment, the crystal is formed by top display device 52.

It goes without saying that various simple variants and modifications fall within the scope of the present invention.

What is claimed is:

1. A display assembly including two superposed, respectively top and bottom, display devices, the top display device including a double structure formed of a display cell arranged above an optical valve, said double structure being arranged so that said cell and said valve are transparent in a first state to make the bottom display device visible, and so that the cell displays an item of data and so that the valve is opaque and at least partially masks the bottom display device in a second switched state, and control means for supplying a control voltage to cause the display cell and the optical valve to switch from the first state to the second state and vice versa, wherein the display cell is of the reflective type in the switched state, and wherein the optical valve is formed of a cell having an absorbent state in the switched state.

2. A display assembly according to claim 1, wherein the cell and the optical valve are in the first transparent state in the absence of any voltage applied by said control means.

3. A display assembly according to claim 1, wherein said display cell is a liquid crystal cell selected from among cells of the twisted nematic (TN), Guest-Host, electrically controlled birefringence (ECB), cholesteric texture, ferroelectric, electrochromic, electrolytic, electrocapillary type.

4. A display assembly according to claim 3, wherein the display cell is formed of a twisted nematic type cell, an absorbent polariser placed in front of the cell, and a reflective polariser placed behind the cell.

5. A display assembly according to claim 1, wherein the optical valve is formed of a twisted nematic type liquid crystal cell, and an absorbent polariser placed behind the cell.

6. A display assembly according to claim 1, wherein the optical valve is formed of a twisted nematic type cell, a polariser placed in front of the cell, a quarterwave plate and a cholesteric film placed in succession behind the cell.

7. A display assembly according to claim 1, wherein the optical valve is formed of an electrolytic cell.

8. A display assembly according to claim 1, wherein the optical valve is formed of an electrochromicl cell.

9. A display assembly according to claim 1, wherein the optical valve is formed of a mercury electrocapillary cell.

10. A display assembly according to claim 1, wherein the optical valve is in the first state in the absence of any voltage applied by said control means, and wherein said optical valve is formed of a switchable cholesteric film.

11. A display assembly according to claim 1, wherein the bottom display device is a display device selected from among the set including an analogue device, digital device or a combination thereof, and a decorative element.

12. A timepiece including a case closed by a crystal and a back cover in which is housed a clockwork movement associated with a display device of time related information, wherein it includes a display assembly according to claim 1, said bottom display device being formed by said display device of time related information, and said top display device extending between the crystal and said display device of time related information.

13. A timepiece according to claim 12, wherein said display device of time related information includes a dial as well as an hour hand and a minute hand which move above the dial.

14. A timepiece according to claim 12, wherein the crystal is formed by the top display device.

* * * * *